United States Patent
Hansen et al.

(10) Patent No.: US 6,697,558 B2
(45) Date of Patent: Feb. 24, 2004

(54) RAMAN AMPLIFIED OPTICAL SYSTEM WITH REDUCTION OF FOUR-WAVE MIXING EFFECTS

(75) Inventors: Per Bang Hansen, Rumson, NJ (US); Robert B. Lee, Middletown, NJ (US); Seo Y. Park, N. Billerica, MA (US); William A. Reed, Summit, NJ (US); Andrew John Stentz, Clinton, NJ (US)

(73) Assignee: Fitel U.S.A. Corp, Norcross, GA (US)

( * ) Notice: Subject to any disclaimer, the term of this patent is extended or adjusted under 35 U.S.C. 154(b) by 306 days.

(21) Appl. No.: 09/772,489

(22) Filed: Jan. 30, 2001

(65) Prior Publication Data

US 2001/0036347 A1 Nov. 1, 2001

Related U.S. Application Data

(60) Provisional application No. 60/186,793, filed on Mar. 3, 2000.

(51) Int. Cl.[7] ................................................. G02B 6/02
(52) U.S. Cl. ..................................... 385/123; 359/341.1
(58) Field of Search ................................. 385/123–128, 385/141–145; 359/341.1–341.5

(56) References Cited

U.S. PATENT DOCUMENTS

| | | |
|---|---|---|
| 4,877,304 A | 10/1989 | Bhagavatula |
| 5,323,404 A | 6/1994 | Grubb |
| 5,327,516 A | 7/1994 | Chraplyvy et al. |
| 5,623,508 A | 4/1997 | Grubb et al. |
| 5,649,044 A | 7/1997 | Bhagavatula |
| 5,673,280 A | 9/1997 | Grubb et al. |
| 5,878,182 A | 3/1999 | Peckham |
| 5,887,093 A | 3/1999 | Hansen et al. |
| 5,887,105 A | 3/1999 | Bhagavatula et al. |
| 5,898,714 A | 4/1999 | Morita et al. |
| 6,118,523 A | 9/2000 | Brener et al. |
| 6,141,142 A | 10/2000 | Espindola et al. |
| 6,163,636 A | 12/2000 | Stentz et al. |
| 6,323,993 B1 * | 11/2001 | Hansen et al. ............... 359/337 |
| 6,370,164 B1 * | 4/2002 | Islam ........................... 372/6 |
| 6,418,256 B1 * | 7/2002 | Danziger et al. ............ 385/123 |
| 6,483,633 B2 * | 11/2002 | Onishi et al. ............. 359/341.31 |
| 6,487,353 B2 * | 11/2002 | Kato et al. ................. 385/127 |
| 6,490,064 B1 * | 12/2002 | Sakamoto et al. .......... 359/124 |

OTHER PUBLICATIONS

Xiang et al., "Wavelength Shift Keying Technique to Reduce Four–Wave Mixing Crosstalk in WDM", 1999, IEEE.*
Inoue "Suppression Technique for Fiber Four–Wave Mixing Using Optical Multi–/Demultiplexers and a Delay Line", Mar. 1993 Journal of Lightwave Technology, vol. 11, No. 3, pp. 455–461.*
Okada et al., "Reduction of Four–Wave Mixing Crosstalk Using a Novel Hybrid WDM/TDM Technique", Sep. 1998, ECOC'98, pp. 289–290.*
Matera et al., "Four–Wave–Mixing Reduction in Fiber Links with Zero Chromatic Dispersion by Limiting Pulse Overlapping", May 2000, CLEO 2000, p. 204.*

* cited by examiner

*Primary Examiner*—Akm Enayet Ullah
*Assistant Examiner*—Michelle R. Connelly-Cushwa
(74) *Attorney, Agent, or Firm*—Wendy W. Koba

(57) ABSTRACT

A transmission fiber for use in a Raman amplified optical communication system is formed to exhibit certain characteristics that limit modulation instability and four-wave mixing in the amplification region, thus reducing the noise component present in the transmission system. In particular, the group-velocity dispersion (denoted as D and measured in terms of ps/nm-km) is restricted to be either non-positive or greater than +1.5 ps/nm-km in the pump wavelength range of interest (a typical pump wavelength range being 1430–1465 nm). Preferably, the magnitude of the dispersion is kept below a value of 10 ps/nm-km in the signal wavelength range of interest (e.g., the "C" band or "L" band). Four-wave mixing is reduced by ensuring that the zero-dispersion frequency of the transmission fiber is not centered between the pump frequency and a frequency experiencing Raman gain.

12 Claims, 10 Drawing Sheets

RAMAN AMPLIFIED OPTICAL SYSTEM WITH REDUCTION OF FOUR-WAVE MIXING EFFECTS

CROSS REFERENCE TO RELATED APPLICATION

This application claims the benefit of Provisional Application No. 60/186,793, filed Mar. 3, 2000.

TECHNICAL FIELD

The present invention relates to a Raman amplified optical system and, more particularly to the utilization of a transmission fiber having predetermined dispersion characteristics so as to reduce the presence of modulation instability and four-wave mixing effects.

BACKGROUND OF THE INVENTION

The subject of Raman amplification is well known in the literature. Stimulated Raman amplification is a nonlinear optical process in which an intense pump wave is injected into an optical fiber that is carrying one or more optical signals. In fused silica fibers, if the pump wavelength is approximately 100 nm shorter than the signal wavelength in the vicinity of 1500 nm, the pump will amplify the signal(s) via stimulated Raman scattering. If the amplification is made to occur in the transmission fiber itself, the amplifier is referred to as a "distributed" amplifier. Such distributed amplification has been found to improve the performance of a communication system, as discussed in the article "Capacity upgrades of transmission systems by Raman amplification", P. B. Hansen et al, appearing in *IEEE Phot. Tech. Lett.*, Vol. 9, 1997, at page 262. For example, if a pump wave is injected into one end of the fiber in a direction counter-propagating with respect to the information signals, the signals will be amplified before their signal-to-noise ratio degrades to an unacceptable level. The performance of such an amplifier is often characterized in terms of its effective or equivalent noise figure and its on/off gain. The effective noise figure is defined as the noise figure that an equivalent post-amplifier would have in order to achieve the same noise performance as the distributed Raman amplifier (see, for example, "Rayleigh scattering limitations in distributed Raman pre-amplifiers", by P. B. Hansen et al., *IEEE Phot. Tech. Lett.*, Vol. 10, 1998 at page 159). Experimentally, the effective noise figure may be found by measuring the noise figure of a span utilizing counter-propagating Raman amplification and then subtracting (in decibels) the passive loss of the span. The on/off gain of a distributed Raman amplifier is defined as the difference (in decibels) between the output signal power with the Raman pump "on" to that with the pump "off".

The concepts of group velocity and group-velocity dispersion are well known in the field of fiber optics. Group velocity is defined as the velocity at which an optical pulse will travel, while group-velocity dispersion is defined as the change in group velocity as a function of wavelength. The group-velocity dispersion, D, is often characterized in terms of ps/nm-km. In these terms, therefore, if light is traveling in an optical waveguide (such as an optical fiber), the group-velocity dispersion depends not only on the materials from which the waveguide is fabricated, but also on the specific design of the index structure used to guide the light. The latter contribution, known as waveguide dispersion, can be used to significantly alter the dispersion characteristics of optical fibers. A complete discussion of this topic can be found in *Fiber-Optic Communication Systems*, Agrawal, John Wiley & Sons, Inc., 1992, at Chapter 2.

The dispersion characteristics of an optical fiber are often be characterized by its zero-dispersion wavelength (ZDW)—the wavelength at which the group velocity dispersion is zero, and its dispersion slope—the change in group velocity dispersion as a function of wavelength. For example, standard single-mode optical fiber (SSMF) has a dispersion that is dominated by the material dispersion of the fused silica and therefore has a ZDW of approximately 1300 nm and a dispersion slope of 0.07 $ps/nm^2$-km.

It is also well known that the effects of group velocity dispersion can be deleterious to the performance of optical communication systems, particularly those employing Raman amplification. For example, in a communication system employing on/off keying, group-velocity dispersion may cause pulses to broaden, extending pulses into their neighboring bit slots and thus introducing errors into the transmitted information signal. Although this effect can be ameliorated by the inclusion of dispersion-compensating devices located periodically throughout the communication system (but at an additional expense) it is advantageous to keep the dispersion of the transmission fiber below 10 ps/nm-km.

Another property of an optical fiber in an optical transmission system which must be controlled is the effective area at the signal wavelengths (see *Nonlinear Fiber Optics*, Agrawal, Academic Press, 1995, second edition, pg. 43, Eq. 2.3.29 for more of a description of "effective area"). If the effective area is increased, then the distributed Raman amplification in the fiber becomes less efficient. However, if the effective area of the fiber becomes too small, then other nonlinear optical effects become larger and degrade the performance of the optical transmission system. Therefore, the transmission fiber must have an effective area that balances the efficiency of the distributed Raman amplification and the degradation of the system from other nonlinear effects.

In the early 1990's, experiments were performed on the transmission of information on multiple wavelengths within a single optical fiber. It was found that a nonlinear optical interaction known as "four-wave mixing" (FWM) (also referred to in the art as four-photon mixing) could limit the performance of the communication system. In FWM, three frequencies, denoted $v_i$, $v_j$ and $v_k$ ($v_k \neq v_i$, $v_j$), interact through the fiber nonlinearity to generate a new frequency, $v_{ijk} = v_i + v_j - v_k$. Since Raman amplified systems utilize an information signal propagating at the signal wavelength, and separate strong pump signals (comprised of multimode pump lasers or several single mode pump lasers) at different pump wavelengths, FWM can occur. The concept of four-wave mixing is well known in the literature, and is discussed in detail in the reference *Optical Fiber Communications, IIIA*, Kaminow and Koch, Academic Press, San Diego, 1997, at chapter 8. It is known that the strength of four-wave mixing can be significantly decreased by increasing the fiber dispersion at the mixing wavelengths. A new class of optical fibers, known as non-zero dispersion-shifted fibers (NZ-DSF) and disclosed in U.S. Pat. No. 5,327,516 issued to A. R. Chraplyvy et al., shift the ZDW of the fibers away from 1550 nm to slightly higher or lower wavelengths, thus adding a small amount of dispersion at those wavelengths. However, current types of NZ-DSF have dispersion zeroes in the wavelength range of 1480–1510 nm.

Another nonlinear optical process well known in the prior art is modulation instability. In this nonlinear optical process, the nonlinear refractive index serves to phase match a four-wave mixing process that would otherwise have been phase mismatched. The result is the generation of sidebands about the injected wavelength for small, positive values of group-velocity dispersion (D), where the frequency offset of the sidebands increases with decreasing dispersion.

Since it will be desirable, in future systems, to use a relatively high power Raman source, as well as multiple Raman pump sources, it is necessary to develop an arrangement for avoiding the effects of modulation instability and four-wave mixing in a Raman amplified optical transmission system.

SUMMARY OF THE INVENTION

The need remaining in the prior art is addressed by the present invention, which relates to a Raman amplified optical system and, more particularly, to a Raman amplified optical system using a transmission fiber having predetermined dispersion characteristics so as to reduce the presence of modulation instability and four-wave mixing effects.

In accordance with the present invention, a Raman amplified optical system is formed to include a transmission fiber defined by a pre-determined set of constraints so as to limit the above-described effects. In particular, a transmission fiber of the present invention is designed to limit modulation instability by exhibiting either a non-positive dispersion or a dispersion greater than +1.5 ps/nm-km at any desired pump wavelength, while also exhibiting a dispersion with a magnitude less than 10 ps/nm-km at a signal wavelength. It is has been found that by carefully controlling the dispersion (D) to remain in these regions, any continuum (i.e., sidebands) generated by the pump will remain relatively narrow and away from regions of large Raman amplification. Thus, any noise components associated with this continuum will be minimal.

Additionally, and further in accordance with the present invention, the presence of four-wave mixing (FWM) is reduced by ensuring that the zero-dispersion wavelength (ZDW) of the transmission fiber is not centered between the pump wavelength and any signal wavelength experiencing large Raman gain. It has been found that if the ZDW is approximately the average of these two wavelength values, the dispersion of the fiber will allow phase matching of FWM components having frequencies within the signal band, allowing these FWM noise components to be amplified and reducing the quality of the transmitted signal.

Other and further characteristics of a Raman amplifier transmission fiber and communication system formed in accordance with the present invention will be apparent during the course of the following discussion and by reference to the accompanying drawings.

BRIEF DESCRIPTION OF THE DRAWINGS

Referring now to the drawings.

DETAILED DESCRIPTION

Figure 1:
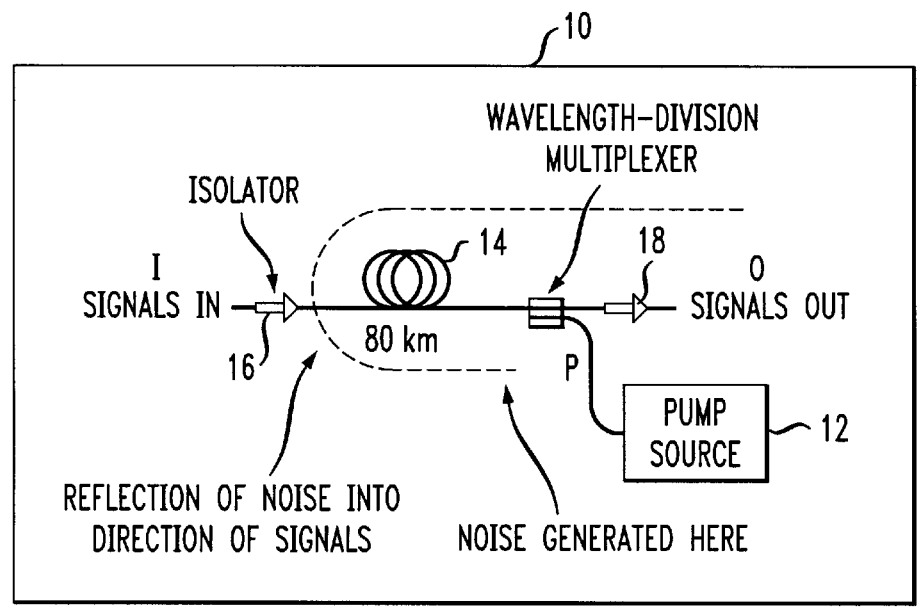
FIG. 1 is a schematic illustration of the generation of noise components in a distributed Raman amplified communication system, using a counter-propagating pump geometry.

FIG. 1 illustrates an exemplary communication system 10 utilizing a counter-propagating Raman pump source 12 to generate distributed Raman amplification within a transmission fiber 14. Under certain conditions as described in detail hereinbelow, the presence of an optical wave (denoted "P") from pump 12 in transmission fiber 14 may give rise to noise components that are initially co-propagating with the pump and counter-propagating relative to input lightwave signals, denoted "I" in FIG. 1. These components are predominantly generated in the ~20 km of fiber nearest pump source 12, that is, when wave P from pump source 12 is most intense. These noise components will then be reflected due to Rayleigh backscattering along the entire length of fiber 14. Additionally, discrete reflections will arise in the span from various components along the transmission path (e.g., rotary splices). The reflected noise components will be amplified by the Raman gain and will exit the system along with the lightwave signals (denoted "O" in FIG. 1), potentially degrading the system performance. An input isolator 16 may be used to prevent the unwanted pump energy from entering the information signal source and, similarly, an output isolator 18 may be used to minimize the amount of extraneous pump left in the output.

Figure 2:
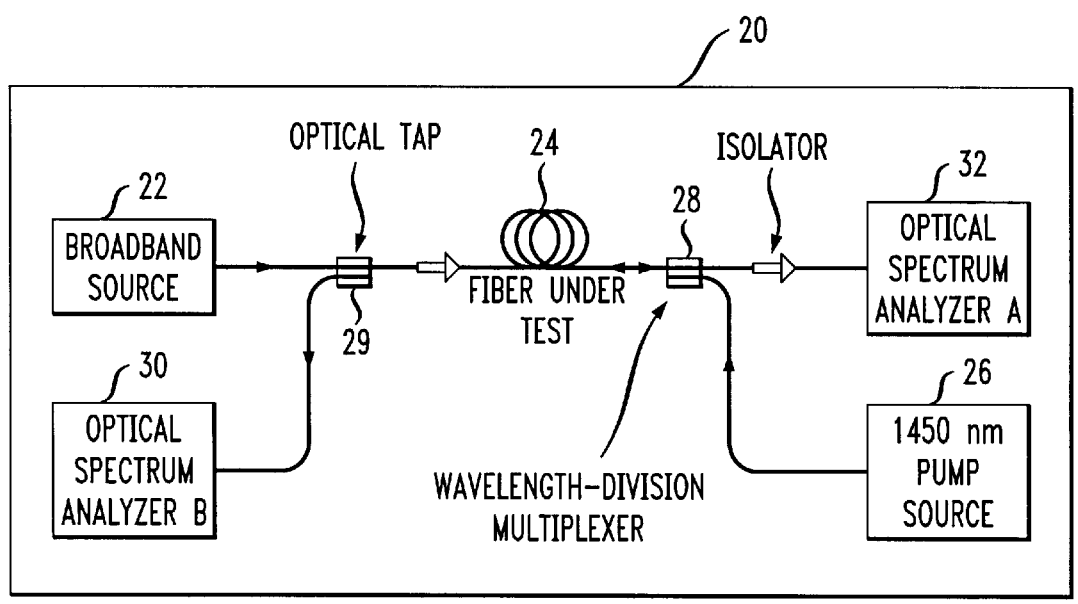
FIG. 2 is a schematic illustration of an experimental arrangement used to evaluate the performance of distributed Raman amplifiers for various types of transmission fibers.

An experimental arrangement 20 used to characterize these noise sources is illustrated in FIG. 2. As shown, the output from a broadband source 22 (such as an LED) is injected into one end of a "fiber under test" 24 in order to probe the Raman gain and noise figure. From the opposite end of fiber 24, a Raman pump 26 (at a wavelength of 1450 nm) is injected through a wavelength division multiplexer 28 and into the span of "fiber under test" 24 to generate the distributed Raman gain. An optical tap 29 and a first optical spectrum analyzer 30 are then used to measure the optical spectrum of the residual pump light, Raman amplified spontaneous emission (ASE), and any generated noise components exiting the span in the counter-propagating direction, as illustrated in FIG. 2. A second optical spectrum analyzer 32 is used to measure the optical spectrum exiting the end of the span under the following three conditions: (1) with only broadband LED source 22 "on", (2) with both broadband LED source 22 and Raman pump 26 "on"; and (3) with only Raman pump 26 "on". With these measurements as collected by spectrum analyzer 32, the spectra of the Raman on/off gain and the effective noise figure spectra can be calculated. Under all cases, the effective noise figures are referenced to the point where "fiber under test" 24 is spliced to wavelength division multiplexer 28. In one example, the measurements were obtained for peak Raman on/off gains ranging from ~15 dB to ~25 dB in increments of 2 dB.

Figure 3:
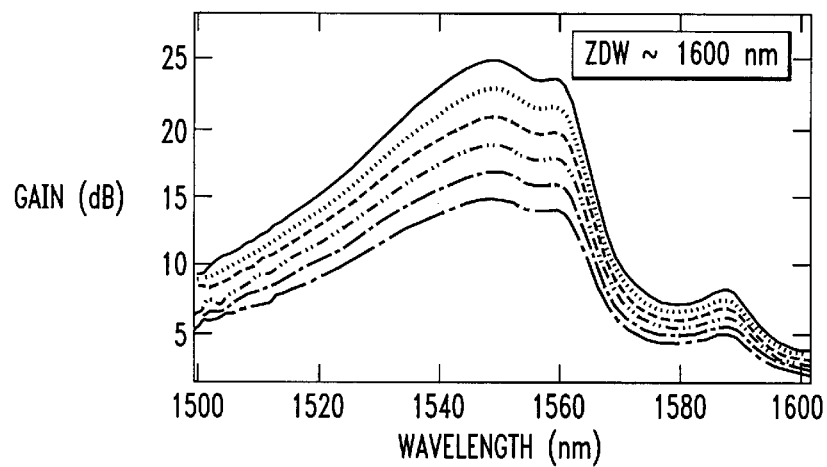
FIGS. 3, 6, 9, 12, 15 and 18 contain plots of the on/off Raman gain spectra, as measured with the arrangement of FIG. 2, for a range of input pump powers and for transmission fibers with nominal average zero-dispersion wavelength (ZDW) of 1600, 1500, 1470, 1428, 1408 and 1376 nm, respectively, where the on/off Raman gain is defined as the ratio of the output signal power with the pump "on" to that with the pump "off"
Figure 4:
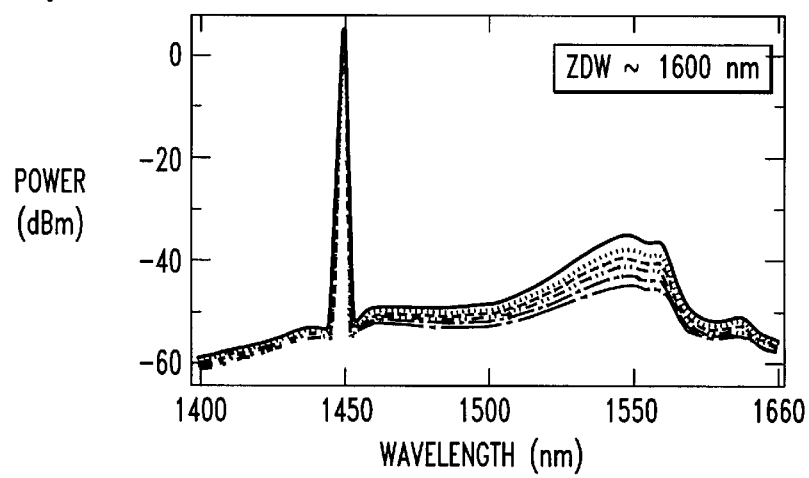
FIGS. 4, 7 10, 13, 16 and 19 contain plots of the residual pump light measured on an optical spectrum analyzer for the range of input pump powers and transmission fibers described above.
Figure 5:
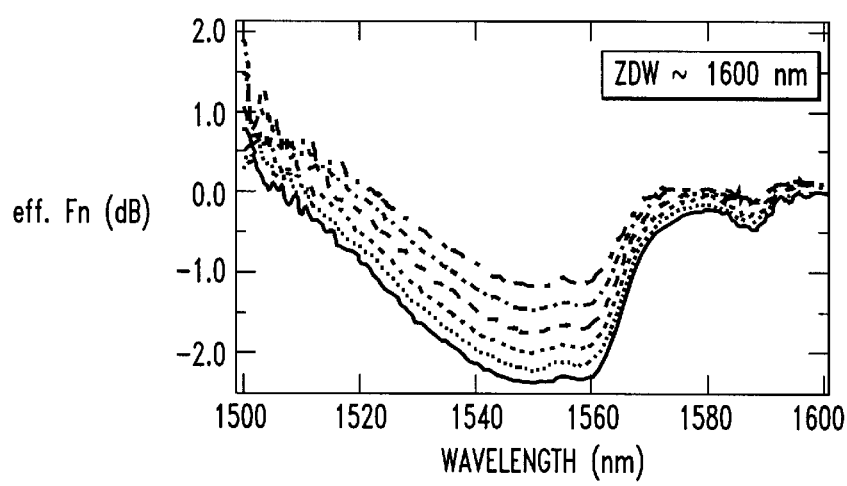
FIGS. 5, 8, 11, 14, 17 and 20 illustrates the effective noise figure spectra of the various arrangements described above, where the effective noise figure is defined as the measured noise figure (with the amplifier "on") minus the passive figure attributed to the fiber itself.

FIGS. 3–5 contain plots of data taken on an 80 km length of TrueWave Minus® fiber installed in test arrangement 20 of FIG. 2. This fiber exhibits a ZDW of approximately 1600 nm and a dispersion slope of 0.08 ps/nm$^2$-km. In this fiber, the dispersion at the pump wavelength of 1450 nm is roughly −12 ps/nm-km. Shown in FIG. 3 is the on/off Raman gain spectra for peak gains ranging from ~15 dB to 25 dB. FIG. 4 contains a plot of the residual pump spectra captured by optical spectrum analyzer 30 (see FIG. 2). As shown, the dominant features in FIG. 4 are the residual pump at 1450 nm and the ASE from the Raman gain generated near 1550 nm. The effective noise figure spectra for various Raman gains (as captured by optical spectrum analyzer 32) are plotted in FIG. 5. The curves in all FIGS. 3–5 are considered exemplary of the prior art.

Figure 6:
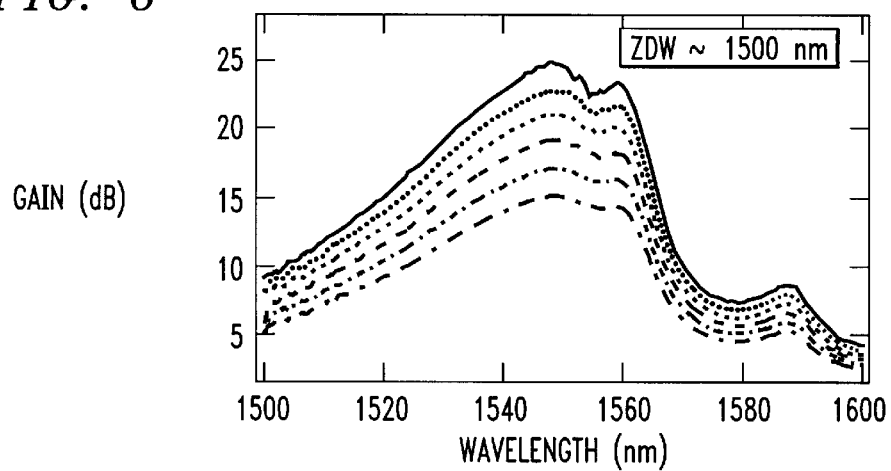
Figure 7:
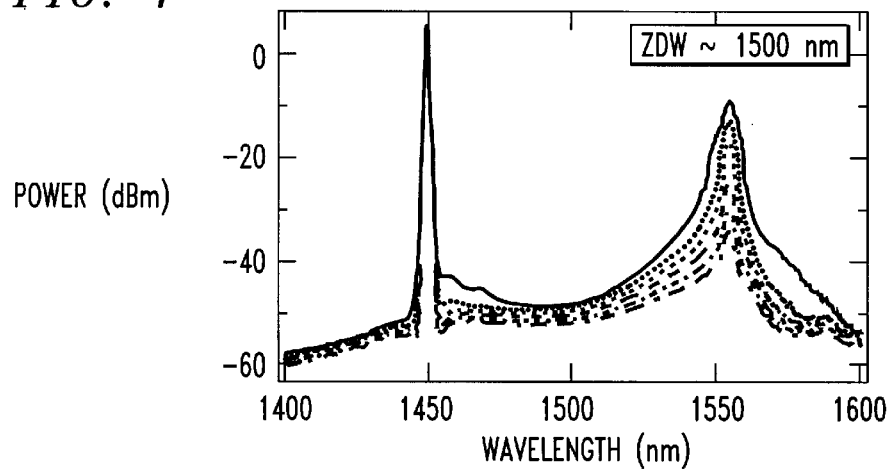
Figure 8:
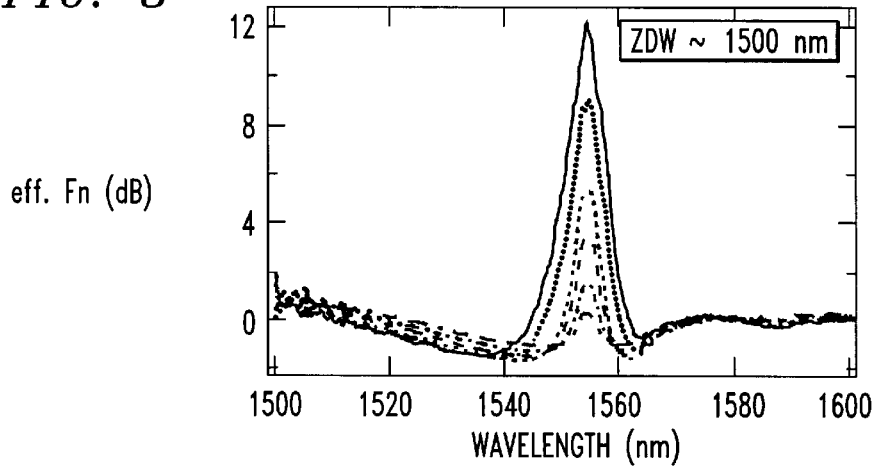

FIGS. 6–8 contain plots of similar data taken on an 80 km length of TrueWave Plus® fiber as installed in test arrangement 20 of FIG. 2. The 20 km length of fiber closest to pump source 26 exhibits an average ZDW of approximately 1500 nm and a dispersion slope of 0.07 ps/nm$^2$-km. In this fiber, the dispersion at the pump wavelength (1450 nm) is roughly −3.5 ps/nm-km. FIG. 6 illustrates the on/off Raman gain spectra for peak gains ranging from ~15 dB to 25 dB, where these spectra are similar to those of a conventional prior art fiber system (see FIG. 3). As shown in FIG. 7, there is a significant increase in noise power near 1550 nm in the residual pump spectra, as compared with the spectra of FIG. 4. This increase in noise is also clearly evident in the effective noise figure spectra plotted in FIG. 8 as compared to that of FIG. 5. The origin of this noise has been found to be four-wave mixing (FWM) among the pump wavelengths near 1450 nm and counter-propagating Raman ASE near 1550 nm. These FWM components are then amplified by the Raman gain and back-scattered to propagate in the same direction as the signal. It has been found that FWM noise will occur in the signal band whenever the ZDW of the transmission fiber occurs at a frequency that is the average of the pump frequency and any frequency experiencing large Raman gain. Under these conditions, the dispersion of the transmission fiber serves to phase match the growth of the FWM components, allowing the noise components to grow to significant levels. In terms of wavelength, this corresponds to the zero dispersion wavelength equal to roughly the average of the pump wavelength and any wavelength experiencing large Raman gain. For the purposes of understanding the teaching of the present invention, this effect will be referred to as the "FWM effect".

Figure 9:
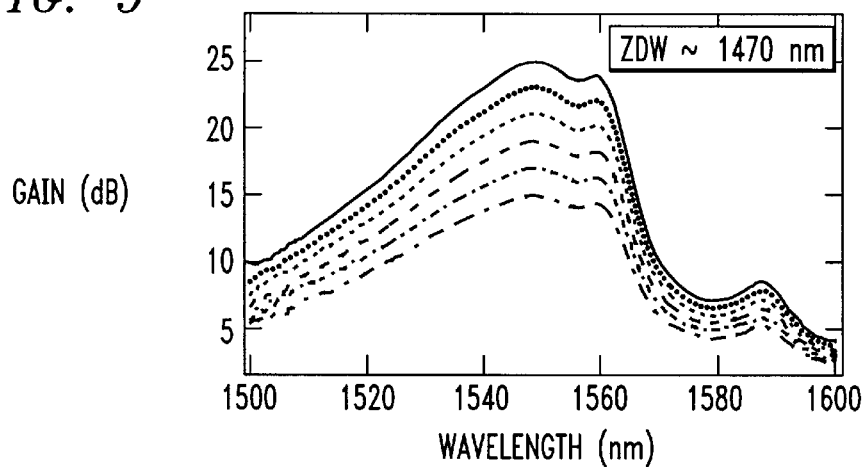
Figure 10:
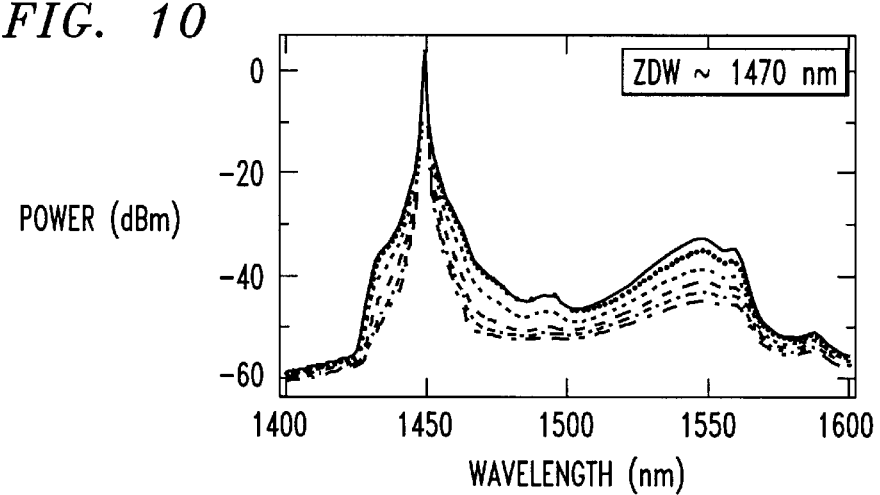
Figure 11:
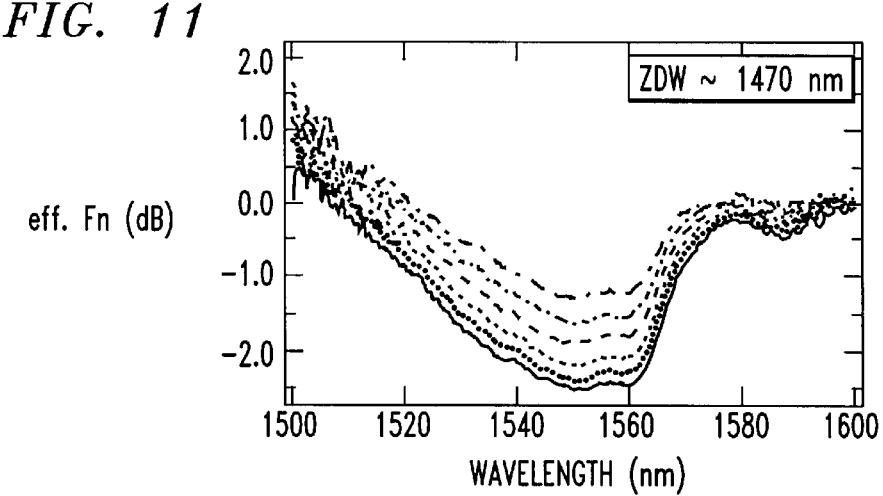

FIGS. 9–11 contain plots of data taken on an 80 km length of TrueWave Reduced Slope® fiber. The 20 km length of fiber closest to pump source 26 exhibits a ZDW of approximately 1470 nm and a dispersion slope of 0.047 ps/nm$^2$-km. In this fiber, the dispersion at the pump wavelength is roughly −1.0 ps/nm-km. As shown in FIG. 10, the "FWM effect" generates some noise components near 1490 nm, but the power levels are substantially reduced when compared to the values in FIG. 7 (due to the much lower Raman gain). It is also to be noted that the pump spectrum experiences some broadening at very low power levels, presumably due to poorly phase matched FWM. For wavelengths greater than 1500 nm, no "excess" noise features are evident in either FIG. 10 or 11.

Figure 12:
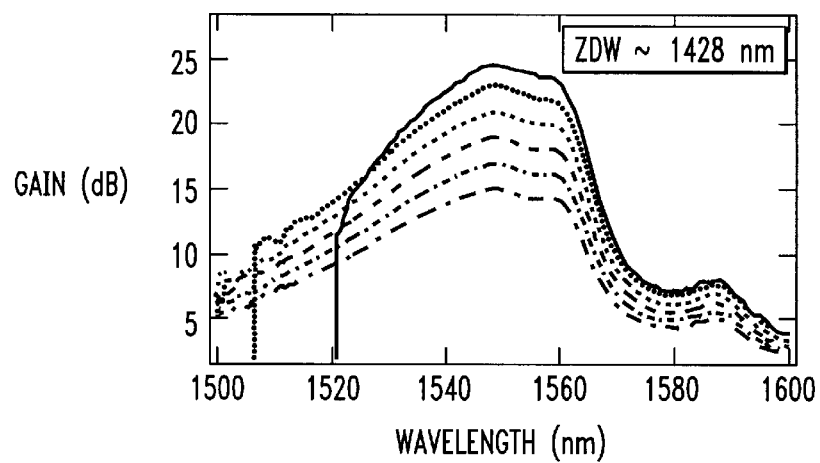
Figure 13:
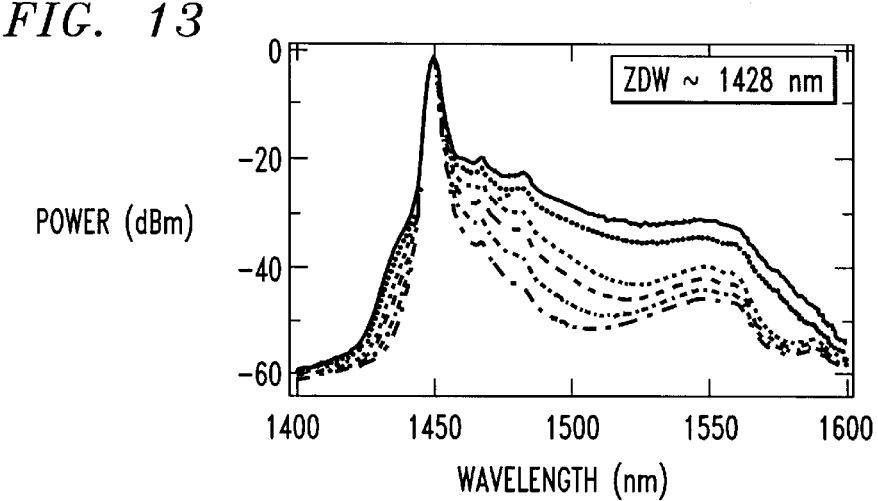
Figure 14:
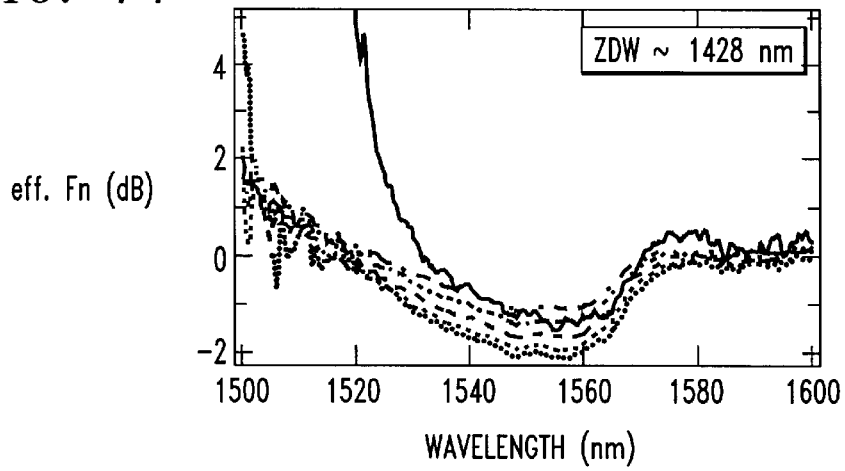

FIGS. 12–14 also contain plots of data taken on an 80 km length of TrueWave Reduced Slope® fiber, but in this case the 20 km length of fiber closest to pump source 26 exhibits a ZDW of approximately 1428 nm and a dispersion slope of 0.042 ps/nm$^2$-km. In this fiber, the dispersion at the pump wavelength is approximately 0.9 ps/mn-km. As shown, there is a dramatic difference in the plots of residual pump spectra at wavelengths greater than 1450 nm when comparing the plot of FIG. 13 to that of FIG. 4. A relatively large continuum of noise extending from the pump wavelength through the ASE at 1550 nm is also shown. There is also a peak generated at 1460 nm, where this type of feature is indicative of modulation instability. It is assumed, in accordance with the present invention, that modulation instability plays a critical role in the continuum generation, given that the continuum is generated for a very low, positive value of D at the pump wavelength, as in FIG. 13, but not for a very low, negative value of D at the pump wavelength, as shown in FIG. 10. For the purposes of the present discussion, this effect will be referred to as the "continuum effect". It is to be noted that the large noise components generated by the pump at wavelengths less than 1530 nm for peak gains of 23 and 25 dB disturb the accurate measurements of the on/off gain under the same conditions as in FIG. 12.

Figure 15:
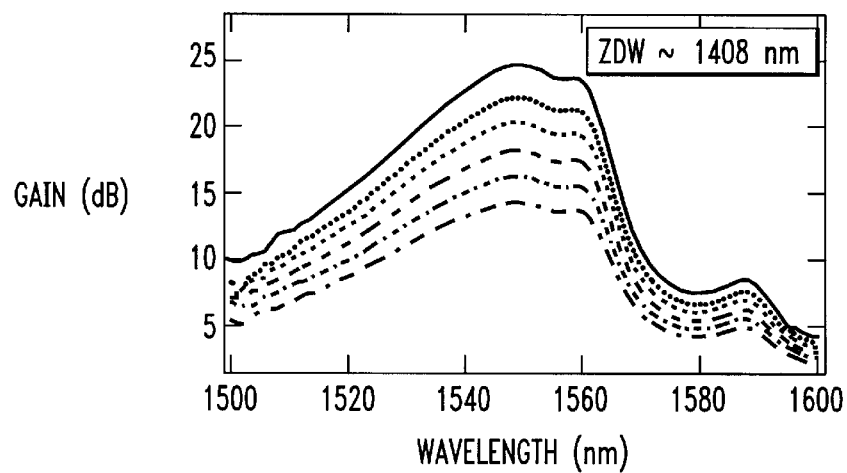
Figure 16:
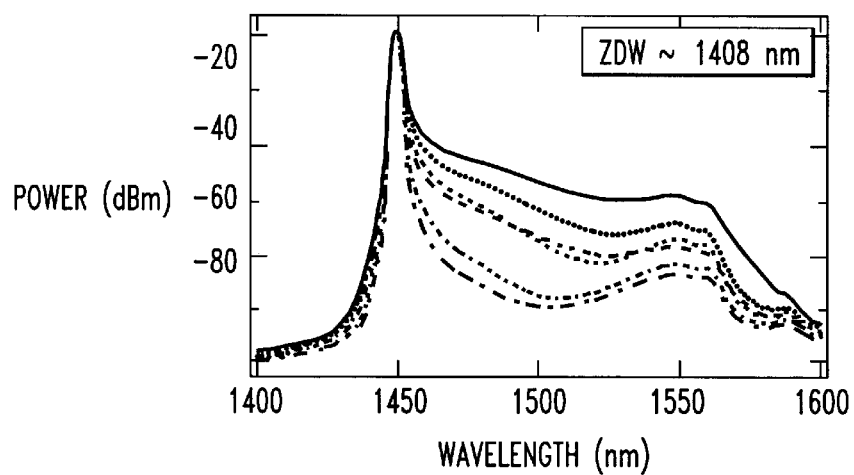
Figure 17:
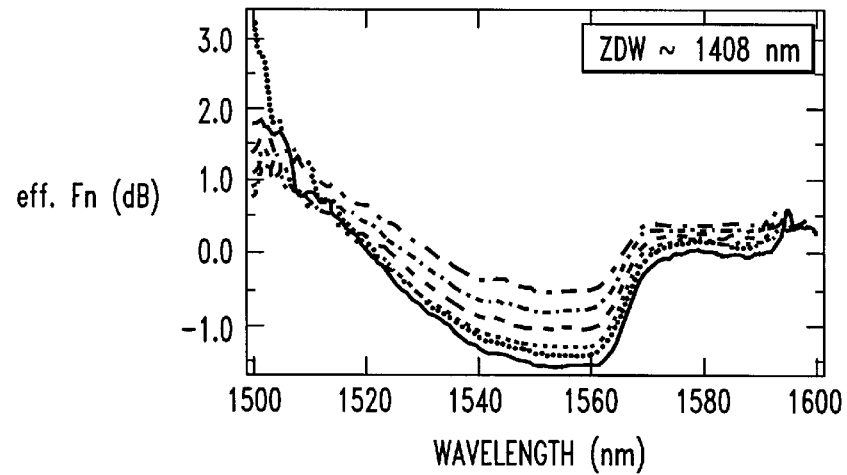

FIGS. 15–17 are associated with a 70 km length of fiber, where the 25 km closest to the pump source exhibits an average ZDW of approximately 1408 nm and a dispersion slope of 0.39 ps/nm$^2$-km. In this fiber, the dispersion at the pump wavelength is roughly 1.6 ps/nm-km. As shown, with the higher dispersion at the pump wavelength, the continuum generation is reduced from the levels shown in FIGS. 12–14, where this is particularly evident in FIG. 17, as compared to the plots of FIG. 4.

Figure 18:
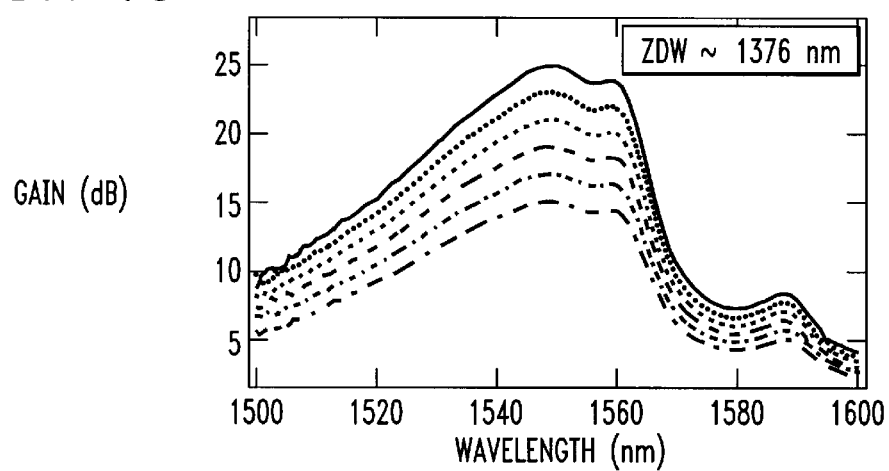
Figure 19:
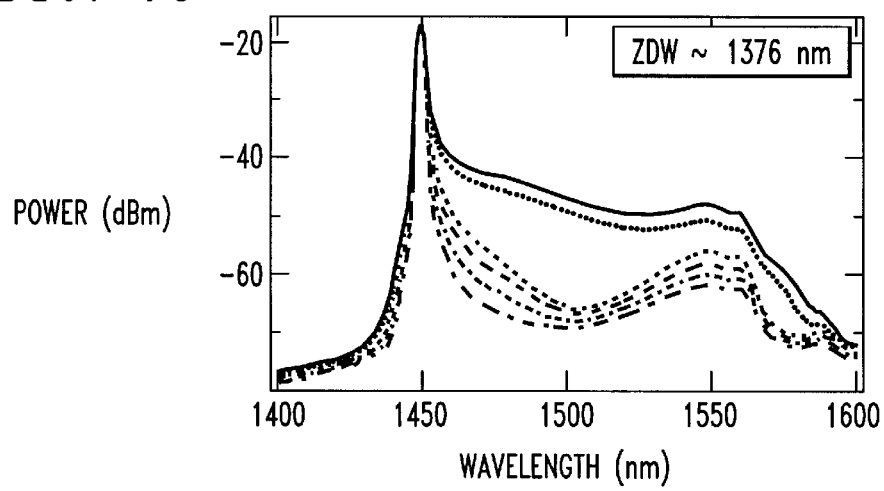
Figure 20:
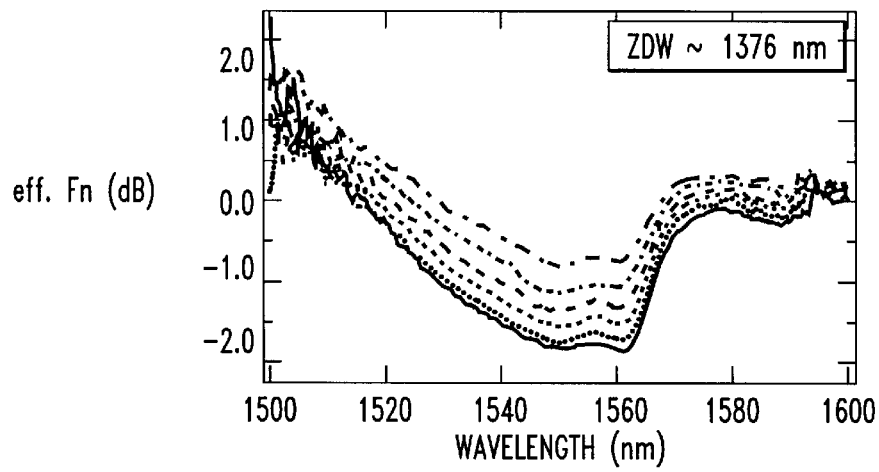

FIGS. 18–20 are associated with a 69 km length of fiber, where the 15 km closest to the pump source exhibits an average ZDW of approximately 1376 nm and a dispersion slope of 0.037 ps/nm$^2$-km. In this fiber, the dispersion at the pump wavelength is roughly 2.7 ps/nm-km. With this higher dispersion at the pump wavelength, the continuum generation is reduced even further from the levels shown above in FIGS. 15–17.

Figure 21:
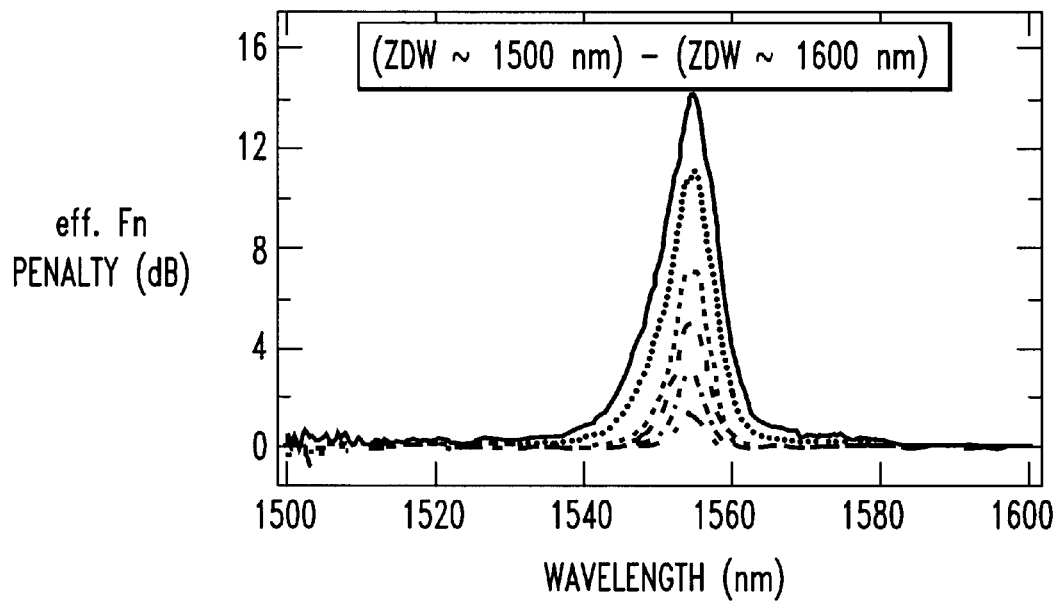
FIG. 21 is a plot of the difference (in decibels) of the effective noise figures measured on fibers with nominal average ZDW of 1500 nm (FIG. 8) and 1600 nm (FIG. 5), for a range of input pump powers.
Figure 22:
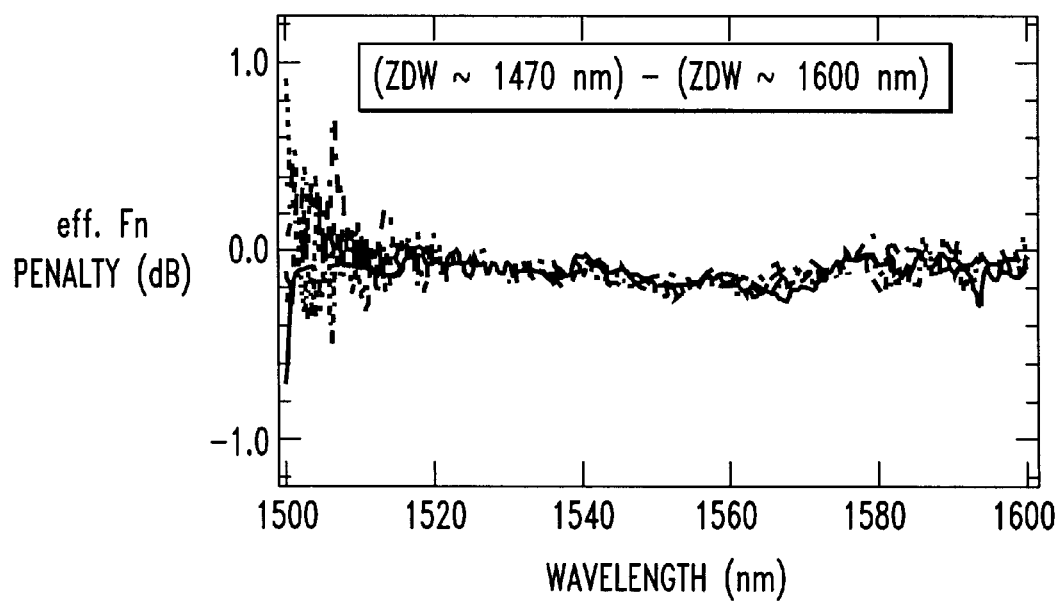
FIG. 22 is a plot of the difference (in decibels) of the effective noise figures measured on fibers with nominal average ZDW of 1470 nm (FIG. 11) and 1600 nm (FIG. 5), for a range of input pump powers.
Figure 23:
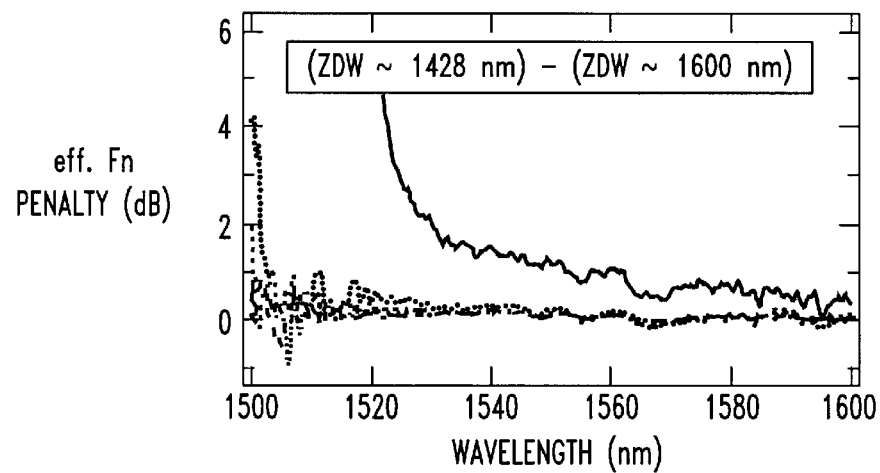
FIG. 23 is a plot of the difference (in decibels) of the effective noise figure measured on fibers with nominal average ZDW of 1428 nm (FIG. 14) and 1600 nm (FIG. 5), for a range of input pump powers.
Figure 24:
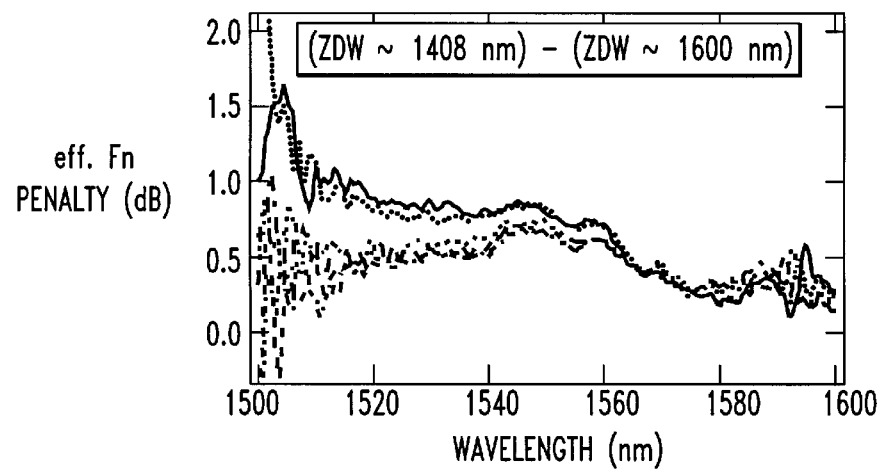
FIG. 24 is a plot of the difference (in decibels) of the effective noise figure measured on fibers with nominal average ZDW of 1408 nm (FIG. 17) and 1600 nm (FIG. 5), for a range of input pump powers.
Figure 25:
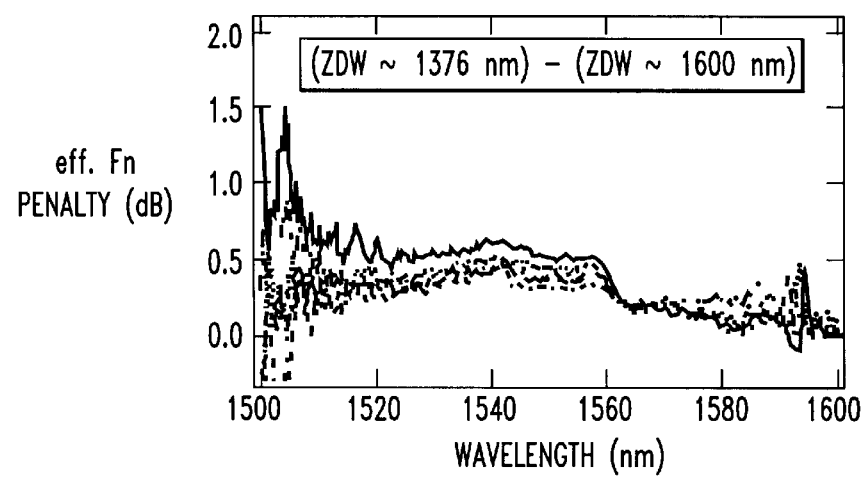
FIG. 25 is a plot of the difference (in decibels) of the effective noise figure measured on fibers with nominal average ZDW of 1376 nm (FIG. 20) and 1600 nm (FIG. 5), for a range of input pump powers.

In FIGS. 21–25, a comparison is made between the effective noise figure curves of FIG. 5 (where the "FWM effect" and "continuum effect" are completely absent) and those of FIGS. 8, 11, 14, 17 and 20, respectively. The comparison is made simply by subtracting the values in FIG. 5 from those in the above-referenced figures, and plotting the results (where, for example, FIG. 21 represents the difference between the values plotted in FIGS. 5 and 8). It is clear that the largest penalties can be attributed to the "FWM effect", where a peak penalty of 14 dB is seen in FIG. 21 for a peak on/off gain of 25 dB, and a substantial penalty (>1 dB) is observed for a peak on/off gain as low as 15 dB. FIG. 22 shows that no penalty could be measured at signal wavelengths greater than 1500 nm for a 1450 nm pump in a fiber with a ZDW of approximately 1470 nm. FIG. 23 shows a substantial penalty induced by the "continuum effect" for the largest on/off gains, particularly for those wavelengths closest to the pump wavelength. FIGS. 24 and 25 illustrate that the penalty from the "continuum effect" is reduced as the dispersion at the pump wavelength is increased to larger values.

Figure 26:
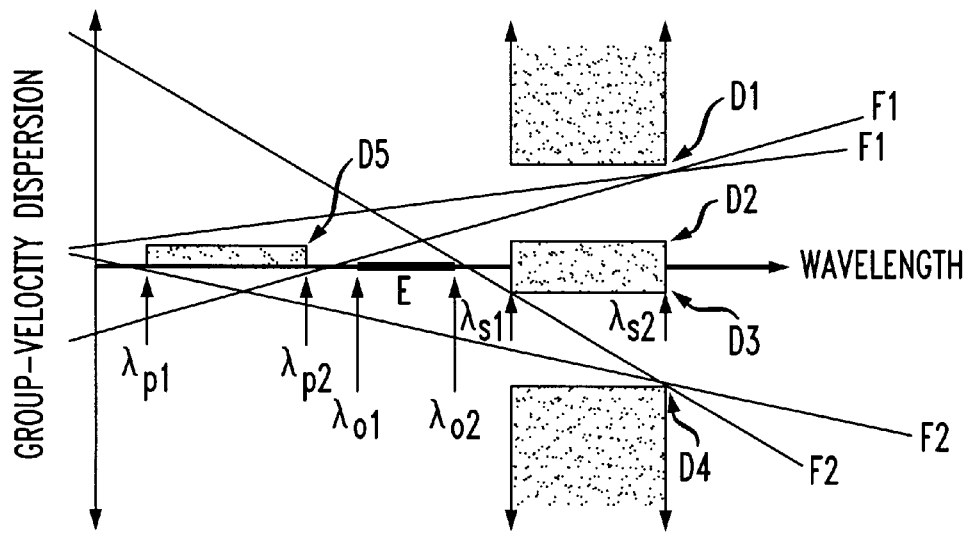
FIG. 26 is a plot of the group-velocity dispersion (D) versus wavelength ($\lambda$), indicating various dispersion regions, as a function of wavelength, to be avoided in order to reduce the effects of modulation instability and four-wave mixing in accordance with the present invention.

Based on all of these findings, therefore, a parameter space for transmission fiber characteristics is defined in accordance with the present invention to reduce the presence of noise components associated with modulation instability and four-wave mixing. FIG. 26 illustrates a definition of this parameter space in terms of group-velocity dispersion (D) as a function of wavelength ($\lambda$). In accordance with the findings of the present invention, effects of modulation instability are reduced in a transmission system fiber by maintaining the fiber dispersion D to be either non-positive or greater than 1.5 ps/nm-km in the range of possible pump wavelengths. Referring to FIG. 26, the "range of possible pump wavelengths" (P), is denoted as $\lambda_{p1}-\lambda_{p2}$, and the associated dispersion values to avoid is indicated by the darkened area labeled "D5" in the drawing. Further, at any signal wavelength (denoted by the range $\lambda_{s1}-\lambda_{s2}$ in FIG. 26), the magnitude of the dispersion D satisfies the either of the following inequalities: D2<D<D1 ps/nm-km, or D4<D<D3 ps/nm-km, where these limits are illustrated as regions D1, D2, D3 and D4 in the drawing. The finite dispersion limits denoted as D2 and D3 are necessary to suppress FWM of the signal wavelengths in a WDM system, as taught in the Chraplyvy et al. reference cited above. In general, and in accordance with the findings as discussed above, modulation instability will not occur if the dispersion value is negative at the pump wavelength. This can be seen by comparing the plot of FIG. 13 (for a fiber with a relatively low (0.9) positive dispersion at the pump wavelength) to the plots of FIGS. 7 and 10 (for fibers with negative dispersion at the pump wavelength). Alternatively, if the fiber dispersion at the pump wavelength is positive and greater than 1.5 ps/nm-km, the frequency shift of the maximum gain will be reduced, narrowing the width of the pump-generated continuum. However, there are disadvantages in having too large a dispersion value at the signal wavelengths. In particular, large dispersion at these wavelengths requires dispersion compensation, which can be costly. While this last factor is not as critical as controlling the dispersion in the pump wavelength range, it will result in an improved overall system cost performance. Transmission fibers with dispersion less than (i.e., more negative) than D4 characteristically have effective areas that are smaller than are required for satisfactory system performance.

Figure 27:
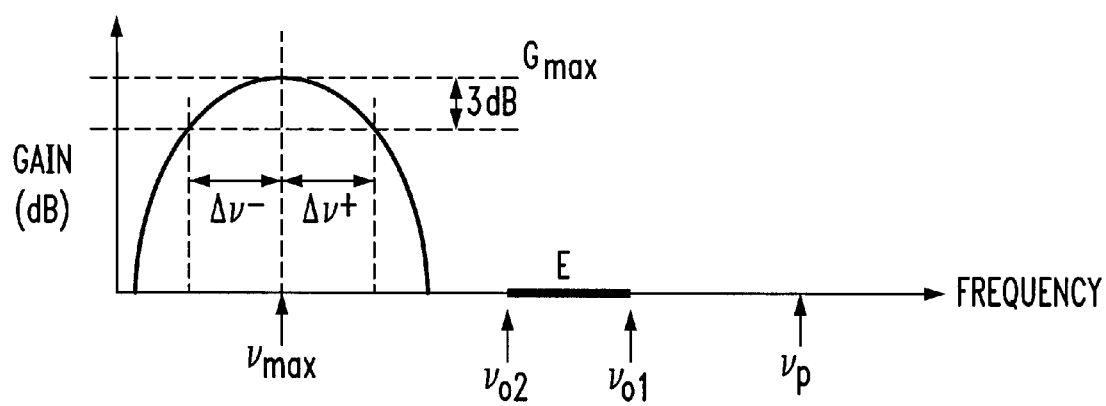
FIG. 27 contains a plot of the relationship between the pump and signal frequencies, indicating the particular frequencies to be avoided to reduce the effects of modulation instability and four-wave mixing in accordance with the present invention.

In accordance with another aspect of the present invention, four-wave mixing (FWM) is reduced in a communication system by ensuring that the zero-dispersion wavelength (ZDW) is not centered between the pump wavelength and a wavelength experiencing large Raman gain. The following relation defines this parameter space in terms of the zero-dispersion frequency of the transmission fiber (ZDF), where the range of frequencies to avoid for ZDF is defined by:

$$\left[\frac{1}{2}(v_p + v_{max}) - \frac{1}{2}\Delta v^-\right] \text{ to } \left[\frac{1}{2}(v_p + v_{max}) + \frac{1}{2}\Delta v^+\right],$$

where $v_{max}$ is defined as the frequency of maximum Raman gain for a given monochromatic Raman pump of frequency $v_p$, $\Delta v^+$ is defined as the difference between the frequency (greater than $v_{max}$) where the gain coefficient is one-half of the maximum gain coefficient and $v_{max}$, and $\Delta v^-$ is defined as the difference between $v_{max}$ and the frequency (less than $v_{max}$) where the gain coefficient is one-half of the maximum gain coefficient. The above relation is illustrated graphically in FIG. 27 and particularly shown as region letter "E" in FIGS. 26 and 27, indicating the particular area between the pump wavelength range and signal wavelength range that is to be avoided for the fiber ZDW.

This constraint significantly reduces FWM by ensuring that none of products of four-wave mixing will lie in the signal wavelength range and thus be subjected to amplification along with the desired information signal. Another constraint on the design of practical optical fibers is that the effective area at the signal wavelengths must remain sufficiently large in order to suppress other non-linear effects.

Taken together, the parameter spaced defined by limiting the range of acceptable dispersion values and fiber ZDW, as well as limits of the minimum effect area, results in defining fiber characteristics that, when implemented, will exhibit significantly reduced noise contributions from modulation instability and four-wave mixing. Different exemplary fibers, illustrating positive dispersion slope (denoted F1) and negative dispersion slope (denoted F2) are shown in FIG. 26. Thus, by using either fiber F1 or F2 as a transmission fiber (or indeed, any other fiber that meets the defined parameter space), these noise components will be minimized.

Although specific embodiments, including preferred wavelength ranges for both a pump and information signal, have been discussed, it is to be understood that the subject matter of the present invention is limited only by the scope of the claims appended hereto. Moreover, it is to be understood that currently available optical fibers do not possess the claimed properties, since the effects of increased noise at signal wavelengths have not been understood and, additionally, fibers exhibiting the claimed properties would be difficult to manufacture.

What is claimed is:

1. An optical fiber for use in a Raman amplified optical transmission system, the transmission system comprising an information signal source for providing an input signal in a predetermined wavelength range of $\lambda_{s1}-\lambda_{s2}$ and utilizing a Raman amplification pump in a predetermined wavelength range of $\lambda_{p1}-\lambda_{p2}$, said fiber exhibiting a predetermined group-velocity dispersion and zero-dispersion wavelength controlled to reduce noise components in the region of Raman amplification by maintaining said predetermined group-velocity dispersion to exhibit a value that is either non-positive or greater than 1.5 ps/nm-km in the pump wavelength range $\lambda_{p1}-\lambda_{p2}$ and maintaining said zero-dispersion frequency away from the average value of the sum of the pump frequency and the signal frequency.

2. An optical fiber as defined in claim 1 wherein the optical fiber further comprises a group-velocity dispersion having a value bounded by −10 ps/nm-km and +10 ps/nm-km in the signal wavelength range $\lambda_{s1}-\lambda_{s2}$.

3. An optical fiber as defined in claim 1 wherein the pump wavelength range is defined as 1430–1465 nm and the signal wavelength range is defined as 1530–1565 nm.

4. An optical fiber as defined in claim 1 wherein the pump wavelength range is defined as 1465–1510 nm and the signal wavelength range is defined as 1565–1610 nm.

5. An optical fiber as defined in claim 1 wherein the pump wavelength range is defined as 1430–1510 nm and the signal wavelength range is defined as 1530–1610 nm.

6. An optical fiber for use in a Raman amplified optical transmission system, the transmission system comprising an information signal source for providing an input signal in a predetermined wavelength range of $\lambda_{s1}$–$\lambda_{s2}$ and utilizing a Raman amplification pump in a predetermined wavelength range of $\lambda_{p1}$–$\lambda_{p2}$, said fiber exhibiting a predetermined zero-dispersion wavelength controlled to reduce four-wave mixing noise components in the region of Raman amplification by maintaining said zero-dispersion frequency away from the average value of the sum of the pump frequency and the signal frequency.

7. A Raman amplified optical transmission system comprising an information signal source for providing an input signal in a predetermined wavelength range of $\lambda_{s1}$–$\lambda_{s2}$;

an optical transmission fiber coupled to the output of the information signal source to provide for transmission of the optical signal to a predetermine location; and a Raman amplification pump coupled to said optical transmission fiber in a manner so as to generate Raman amplification of said input signal in said optical transmission fiber, said Raman pump source supplying a pump wave in a predetermined wavelength range of $\lambda_{p1}$–$\lambda_{p2}$, wherein said fiber exhibits a predetermined group-velocity dispersion and zero-dispersion wavelength controlled to reduce noise components in the region of Raman amplification by maintaining said predetermined group-velocity dispersion to exhibit a value that is either non-positive or greater than 1.5 ps/nm-km in the pump wavelength range $\lambda_{p1}$–$\lambda_{p2}$ and maintaining said zero-dispersion frequency away from the average value of the sum of the pump frequency and the signal frequency.

8. A Raman amplified optical transmission system as defined in claim 7 wherein the transmission fiber further comprises a group-velocity dispersion having a value bounded by −10 ps/nm-km and +10 ps/nm-km in the signal wavelength range $\lambda_{s1}$–$\lambda_{s2}$.

9. A Raman amplified optical transmission system a defined in claim 7 wherein the pump wavelength range is defined as 1430–1465 nm and the signal wavelength range is defined as 1530–1565 nm.

10. A Raman amplified optical transmission system as defined in claim 7 wherein the pump wavelength range is defined as 1465–1510 nm and the signal wavelength range is defined as 1565–1610 nm.

11. A Raman amplified optical transmission system a defined in claim 7 wherein the pump wavelength range is defined as 1430–1510 nm and the signal wavelength range is defined as 1530–1610 nm.

12. A Raman amplified optical transmission system comprising an information signal source for providing an input signal in a predetermined wavelength range of $\lambda_{s1}$–$\lambda_{s2}$;

an optical transmission fiber coupled to the output of the information signal source to provide for transmission of the optical signal to a predetermined location; and a Raman amplification pump source coupled to said optical transmission fiber in a manner so as to generate Raman amplification of said input signal in said optical transmission fiber, said Raman pump source supplying a pump wave in predetermined wavelength range of $\lambda_{p1}$–$\lambda_{p2}$, wherein said fiber exhibits a predetermined zero-dispersion wavelength controlled to reduce four-wave mixing noise components in the region of Raman amplification by maintaining said zero-dispersion frequency away from the average value of the sum of the pump frequency and the signal frequency.

\* \* \* \* \*